US012794812B2

(12) United States Patent
Zhang

(10) Patent No.: US 12,794,812 B2
(45) Date of Patent: Nov. 10, 2026

(54) DYNAMIC LOAD-BALANCING

(71) Applicant: Juniper Networks, Inc., Sunnyvale, CA (US)

(72) Inventor: Zhaohui Zhang, Westford, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 46 days.

(21) Appl. No.: 18/929,999

(22) Filed: Oct. 29, 2024

(65) Prior Publication Data

US 2025/0202824 A1 Jun. 19, 2025

Related U.S. Application Data

(60) Provisional application No. 63/610,153, filed on Dec. 14, 2023.

(51) Int. Cl.
*G06F 15/173* (2006.01)
*H04L 45/02* (2022.01)
*H04L 47/122* (2022.01)
*H04L 47/125* (2022.01)

(52) U.S. Cl.
CPC ............ *H04L 47/125* (2013.01); *H04L 45/04* (2013.01); *H04L 47/122* (2013.01)

(58) Field of Classification Search
CPC ...... H04L 47/125; H04L 47/122; H04L 45/04
See application file for complete search history.

(56) References Cited

U.S. PATENT DOCUMENTS

| | | | | |
|---|---|---|---|---|
| 7,522,603 | B2 | 4/2009 | Vasseur | |
| 2020/0014623 | A1 * | 1/2020 | Wang | H04L 45/66 |
| 2022/0006756 | A1 * | 1/2022 | Ramaswamy | H04L 47/2441 |
| 2022/0231937 | A1 * | 7/2022 | Liu | H04L 45/123 |
| 2025/0132972 | A1 * | 4/2025 | Saad | H04L 12/4641 |

FOREIGN PATENT DOCUMENTS

WO WO-2018103099 A1 6/2018

OTHER PUBLICATIONS

Extended European Search Report for European Application No. EP242185908 dated Apr. 11, 2025, 98 pages.

Malhotra N., et al., "Weighted Multi-path Procedures for Evpn Multi-homing Draft-ietf-bess-evpn-unequal-lb-21; Draft-ietf-bess-evpn-unequal-lb-21.Txt", Weighted Multi-path Procedures for Evpn Multi-homing Draft-ietf-bess-evpn-unequal-lb-21; Draft-ietf-bess-evpn-unequal-lb-21.Txt; Bess, Internet Engineering Task Force, Ietf; Standardworkingdraft, INTE No. 21, Dec. 7, 2023 (Dec. 7, 2023), pp. 1-22, XP015163833. Retrieved from the Internet: URL:https://tools.ietf.org/html/draft-ietf: bess-evpn-unequal-lb-21.

(Continued)

*Primary Examiner* — Joseph R Maniwang
(74) *Attorney, Agent, or Firm* — Harrity & Harrity, LLP

(57) ABSTRACT

In some implementations, an ingress provider edge network device (PE) may obtain dynamic load information associated with respective links of a plurality of multi-homing (MH) PEs. The ingress PE may determine based on the dynamic load information, a dynamic load-balancing scheme associated with the plurality of MH PEs. The ingress PE may forward traffic using the dynamic load-balancing scheme.

20 Claims, 9 Drawing Sheets

(56) References Cited

OTHER PUBLICATIONS

Sajassi A et al., “EVPN Support for L3 Fast Convergence and Aliasing/Backup Path draft-ietf-bess-evpn-ip-aliasing-00; draft-ietf-bess-evpn-ip-aliasing-00.txt”, Evpn Support for L3 Fast Convergence and Aliasing/Backup Path Draft-Ietf-Bess-Evpn-Ip-Aliasing-00; Draft-Ietf-Bess-Evpn-Ip-Aliasing-00.Txt; Internet-Draft: Network Working Group, Internet Engineering Dec. 1, 2023 (Dec. 1, 2023), pp. 1-22, XP015163714, Retrieved from the Internet: URL:https://tools.ietf.org/html/draft-ietf -bess-evpn-ip-aliasing-00.

* cited by examiner

200

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     0x03      |      TBD      |      Reserved (must be 0)     |
+-+-+-+-+-+-+-+-+-+-+-+-+-+-+-+-+-+-+-+-+-+-+-+-+-+-+-+-+-+-+-+-+
|                            Link ID                            |
+-+-+-+-+-+-+-+-+-+-+-+-+-+-+-+-+-+-+-+-+-+-+-+-+-+-+-+-+-+-+-+-+
```

FIG. 2

DYNAMIC LOAD-BALANCING

CROSS-REFERENCE TO RELATED APPLICATION

This patent application claims priority to U.S. Patent Application No. 63/610,153, filed on Dec. 14, 2023, and entitled "ETHERNET VIRTUAL PRIVATE NETWORK (EVPN) DYNAMIC LOAD BALANCING TO MULTI-HOMING ETHERNET SEGMENTS." The disclosure of the prior application is considered part of and is incorporated by reference into this patent application.

BACKGROUND

In a multi-homed network configuration (e.g., an Ethernet virtual private network (EVPN) configuration, an Internet protocol (IP) network configuration, or another type of network configuration), an ingress provider edge network device (PE) is a first PE in a path that receives traffic destined for a multi-homed endpoint device.

SUMMARY

In some implementations, a method includes obtaining, by an ingress PE, dynamic load information associated with respective links of a plurality of multi-homing (MH) PEs; determining, by the ingress PE, based on the dynamic load information, a dynamic load-balancing scheme associated with the plurality of MH PEs; and forwarding, by the ingress PE, traffic using the dynamic load-balancing scheme.

In some implementations, a non-transitory computer-readable medium storing a set of instructions includes one or more instructions that, when executed by one or more processors of an ingress PE, cause the ingress PE to: determine, based on dynamic load information associated with respective links of a plurality MH PEs, a dynamic load-balancing scheme associated with the plurality of MH PEs; and forward traffic using the dynamic load-balancing scheme.

In some implementations, an ingress PE includes one or more memories; and one or more processors to: obtain dynamic load information associated with respective links of a plurality of MH PEs; and determine, based on the dynamic load information, a dynamic load-balancing scheme associated with the plurality of MH PEs that is to be used by the ingress PE to forward traffic.

BRIEF DESCRIPTION OF THE DRAWINGS

FIG. 2 is a diagram of an example implementation associated with an extended community (EC) of an EVPN advertisement message.

DETAILED DESCRIPTION

Figure 1A:
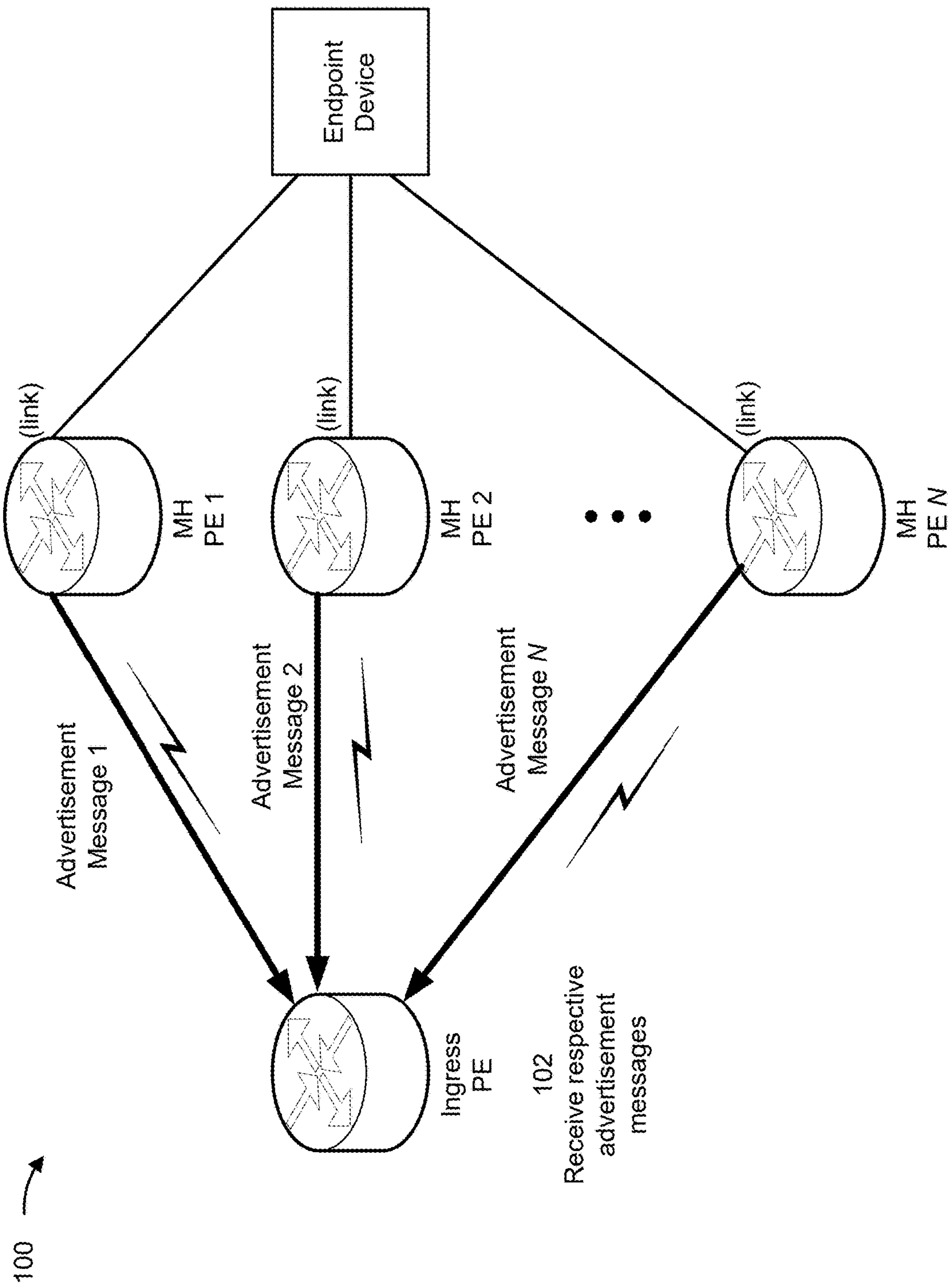
FIGS. 1A-1D are diagrams of an example implementation associated with dynamic load-balancing.

The following detailed description of example implementations refers to the accompanying drawings. The same reference numbers in different drawings may identify the same or similar elements.

An ingress PE can use a static load-balancing scheme to distribute portions of traffic, that is destined for an endpoint device, to different MH PEs associated with the endpoint device. For example, the ingress PE can use a static weighted load-balancing based on respective capacities (e.g., bandwidths) of the MH PEs, which are advertised to the ingress PE by the MH PEs. However, the respective capacities of the MH PEs seldom change, and the ingress PE does not consider respective loads (e.g., utilization rates) of the MH PEs when making load-balancing decisions. Consequently, a portion of traffic is often forwarded to an overloaded MH PE or is not forwarded to an underloaded MH PE. This can impact a networking performance of the MH PEs (e.g., in terms of latency, throughput, or another networking performance parameter) and a utilization efficiency of computing resources (e.g., processing resources, memory resources, communication resources, and/or power resources, among other examples) of the MH PEs.

Some implementations described herein include an ingress PE and a plurality of MH PEs. An endpoint device is multi-homed by the plurality of MH PEs. The ingress PE receives respective advertisement messages from the plurality of MH PEs. An advertisement message, sent by an MH PE, includes a link identifier that identifies a link of the MH PE that connects the MH PE, via a connection, to the endpoint device. The link identifier may be a local link identifier (e.g., that is generated by the MH PE, such as to identify the link). When the ingress PE and the plurality of MH PEs are associated with an IP network, the advertisement message may be an IP route advertisement message (e.g., an IP route advertisement message), or a similar type of advertisement message. When the ingress PE and the plurality of MH PEs are associated with an EVPN, the advertisement message may be an EVPN advertisement message (e.g., an EVPN auto-discovery per Ethernet segment (ES) route), or a similar type of advertisement message. Accordingly, the EVPN advertisement message may comprise an extended community (EC) that includes the link identifier.

In some implementations, the ingress PE obtains dynamic load information associated with the plurality of MH PEs. For example, a particular MH PE, of the plurality of MH PES, may send, to the ingress PE, a message that includes particular dynamic load information associated with the particular MH PE. The particular dynamic load information indicates a dynamic load associated with the link identifier (e.g., a dynamic load on the link that is identified by the link identifier). In this way, the ingress PE obtains dynamic load information for each link identified by the respective advertisements.

The ingress PE then determines a dynamic load-balancing scheme (e.g., based on the dynamic load information). That is, the ingress PE may determine, based on the dynamic load information, a dynamic load balancing weight for each MH PE, which can be used to facilitate an optimal load-based utilization of the respective links of the plurality of MH PEs for forwarding traffic (e.g., traffic that is destined for the endpoint device).

Accordingly, the ingress PE forwards the traffic to the plurality of MH PEs using the load-balancing scheme. For example, the ingress PE may determine, based on the load-balancing scheme, a first dynamic load-balancing weight for a first MH PE, of the plurality of MH PEs, and a second dynamic load-balancing weight for a second MH PE of the plurality of MH PEs. The ingress PE then may forward, using the first dynamic load-balancing weight and the second dynamic load-balancing weight, respective portions of the traffic to the first MH PE and the second MH PE.

In this way, some implementations enable dynamic load-balancing of traffic. Further, the ingress PE, by utilizing advertisements and dynamic load information provided by the MH PEs (rather than by intermediary devices), determines and uses a dynamic load-balancing scheme that can be implemented at an overlay level (as opposed to an underlay level). Accordingly, the ingress PE makes load-balancing decisions for traffic that is destined for the endpoint device using real-time (or near-real-time) load information, which the ingress PE uses to forward respective portions of the traffic among the MH PEs. This results in improved networking performance of the MH PEs (e.g., in terms of latency, throughput, or another networking performance parameter) and improved utilization efficiency of computing resources (e.g., processing resources, memory resources, communication resources, and/or power resources, among other examples) of the MH PEs. For example, the ingress PE may forward a portion of traffic to an underloaded MH PE, and may refrain from forwarding another portion of traffic to an overloaded PE, which is not otherwise possible using existing static load-balancing schemes.

FIGS. 1A-1D are diagrams of an example implementation 100 associated with dynamic load-balancing. As shown in FIGS. 1A-1D, example implementation 100 includes an ingress PE, a plurality of MH PEs (shown as MH PE 1 through PE N, where N≥2) and an endpoint device. These devices are described in more detail below in connection with FIGS. 3-5.

As shown in FIGS. 1A-1D, the endpoint device may be multi-homed by the plurality of MH PEs. That is, the endpoint device may be connected to each MH PE of the plurality of MH PEs. For example, the endpoint device may be connected to the plurality of MH PEs via connections to respective links of the plurality of MH PEs. In some implementations, each MH PE may be connected to the endpoint device and/or to one or more other destinations via a link of the MH. That is, the MH PE may be connected to the endpoint device and/or to the one or more destinations via the link and one or more connections (e.g., next-hops) between one or more other network devices.

When the ingress PE and the plurality of MH PEs are associated with an EVPN (hereinafter referred to as an "EVPN configuration"), the respective links of the MH PEs may be attachment circuits (ACs). Accordingly, each connection may be associated with an ES, and therefore each connection (e.g., between an AC of a MH PE and the endpoint device) may be associated with an ES identifier (ESI) that identifies (e.g., uniquely identifies) the connection. When the ingress PE and the plurality of MH PEs are associated with an IP network (hereinafter referred to as an "IP configuration"), the respective links of the MH PEs may be IP links.

As further shown in FIGS. 1A-1D, the ingress PE may be connected to the plurality of MH PEs via respective sets of one or more connections. That is, the ingress PE may be directly connected to an MH PE, or may be indirectly connected to the MH via one or more other PEs. The ingress PE may be configured as a first PE (e.g., within an EVPN configuration or an IP configuration) that receives traffic that is destined for the endpoint device. The ingress PE may therefore be configured to forward the traffic to the endpoint device via the plurality of MH PEs using a dynamic load-balancing scheme, as further described herein.

As shown in FIG. 1A, and by reference number 102, the ingress PE may receive respective advertisement messages (e.g., from the plurality of MH PEs). In some implementations, the plurality of MH PEs may send the respective advertisement messages to the ingress PE via the sets of one or more connections that connect the ingress PE and the plurality of MH PEs, which therefore causes the ingress PE to receive the respective advertisement messages. For example, a particular MH PE, of the plurality of MH PEs, may send, to the ingress PE, a particular advertisement message via a particular set of one or more connections that connect the ingress PE and the particular MH PE.

Each advertisement message may include a link identifier that identifies a link of an MH PE (e.g., a link of the MH PE that sends the advertisement message), such as the link that connects the MH PE, via a connection, to the endpoint device or to one or more other destinations. In some implementations, the link identifier may be a local link identifier (e.g., that is generated by the MH PE, such as to identify the link).

In the IP configuration, the advertisement message may be an IP route advertisement message (e.g., an IP route advertisement message, an IP VPN route advertisement message, along with other examples), or a similar type of advertisement message. In the EVPN configuration, the advertisement message may be an EVPN advertisement message (e.g., an EVPN auto-discovery per Ethernet segment (ENTITY SYSTEM) route), or a similar type of advertisement message. Accordingly, as further described herein in relation to FIG. 2, the EVPN advertisement message may comprise an EC that includes the link identifier (e.g., the local link identifier). The EVPN advertisement message may also comprise information identifying the ESI of the connection between the link and the endpoint device, and, therefore, by including the EC, the EVPN advertisement message may indicate an association between the ESI and the link identifier. Alternatively, in the EVPN configuration, the link identifier may be the ESI, and thus the EVPN advertisement message may comprise the information identifying the ESI (and may not comprise the EC).

Figure 1B:
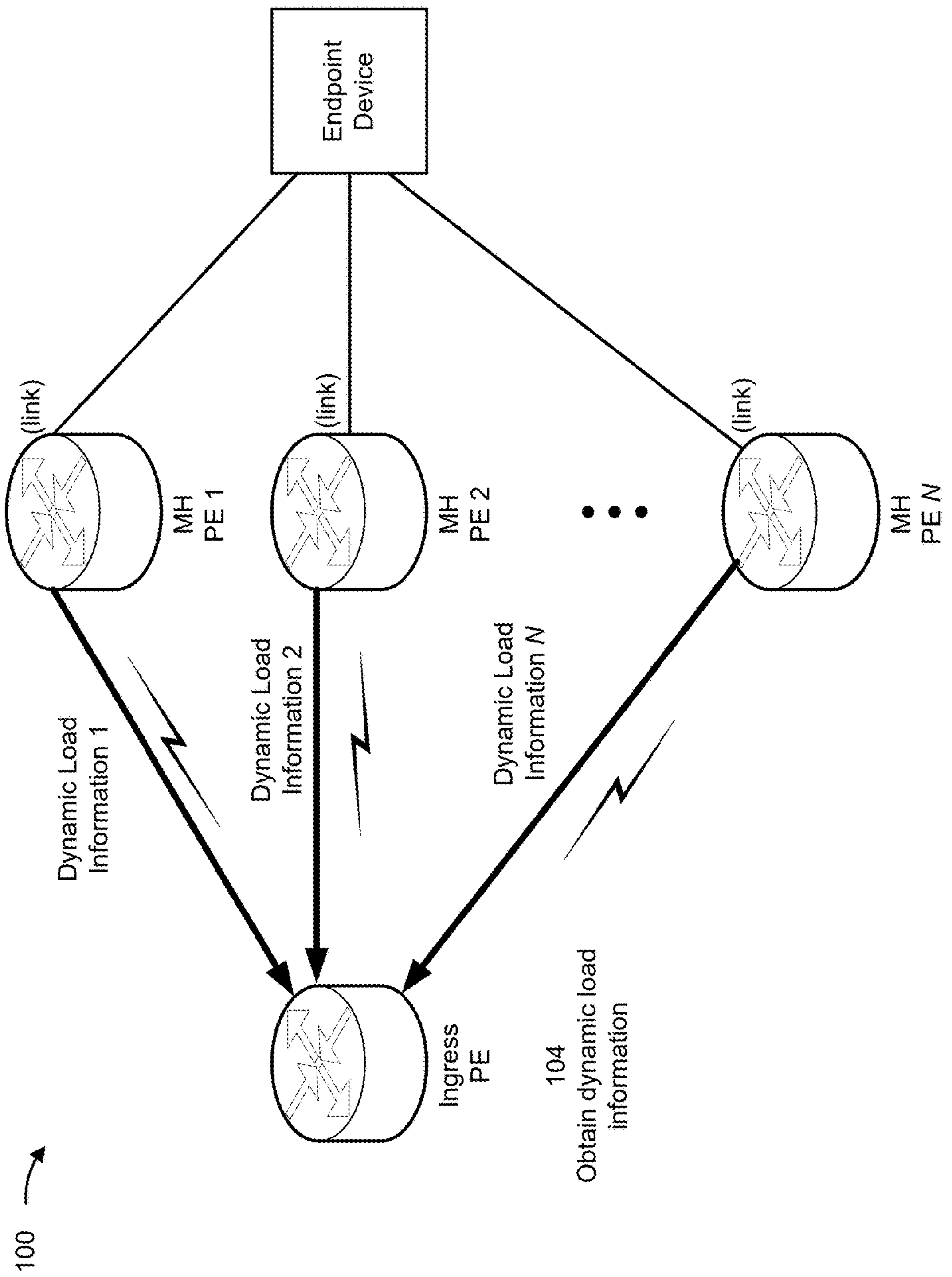

As shown in FIG. 1B, and by reference number 104, the ingress PE may obtain dynamic load information (e.g., from the plurality of MH PEs). In some implementations, the plurality of MH PEs may send respective dynamic load information (e.g., associated with each MH PE) to the ingress PE via the sets of one or more connections that connect the ingress PE and the plurality of MH PEs. This causes the ingress PE to receive the respective dynamic load information as dynamic load information. For example, a particular MH PE, of the plurality of MH PEs, may send, to the ingress PE, a message, such as a user datagram protocol (UDP) message, that comprises a time-length-value (TLV) that includes particular dynamic load information associated with the particular MH PE.

The dynamic load information may be associated with the respective links of the plurality of MH PEs. For example, particular dynamic load information (e.g., that was obtained from a particular MH PE of the plurality of MH PEs), of the dynamic load information, may be associated with a link of the particular MH PE (e.g., the link that connects the MH PE to the endpoint device). The particular dynamic load information may include a link identifier (e.g., the link identifier described above that identifies the link of the particular MH PE) and a dynamic load associated with the link identifier (e.g., a dynamic load on the link that is identified by the link identifier). The dynamic load may indicate, for example, a real-time, or near-real-time, amount of traffic associated with the link identifier (e.g., a real-time, or near-real-time, amount of traffic on the link of the particular MH).

Figure 1C:
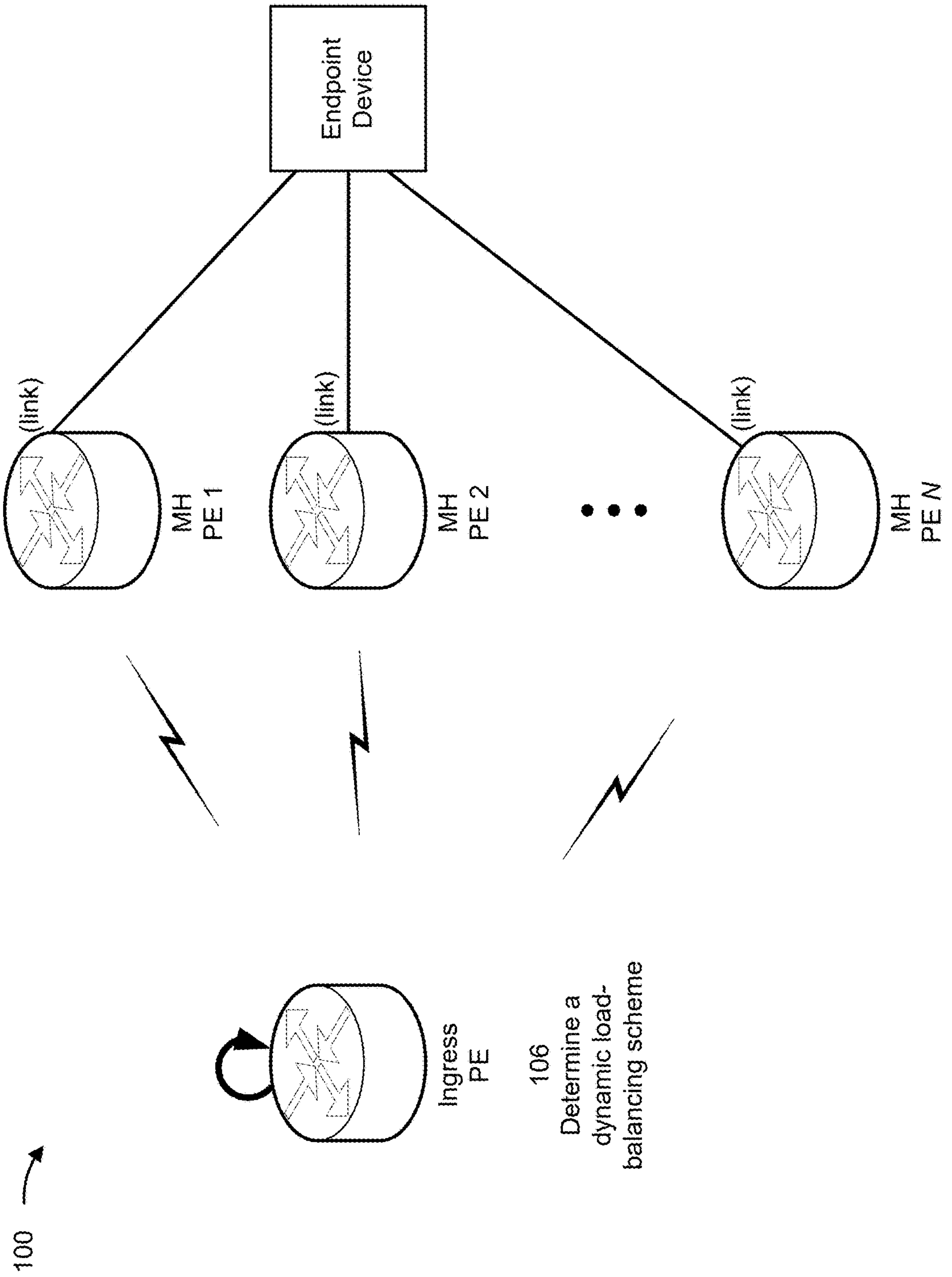

As shown in FIG. 1C, and by reference number 106, the ingress PE may determine a dynamic load-balancing scheme (e.g., associated with the plurality of MH PEs). In some implementations, the ingress PE may determine the dynamic load-balancing scheme based on the dynamic load information. That is, the ingress PE may determine, based on the dynamic load information, a dynamic load balancing weight for each MH PE, which can be used to facilitate an optimal load-based utilization of the respective links of the plurality of MH PEs for forwarding traffic (e.g., traffic that is destined for the endpoint device).

Figure 1D:
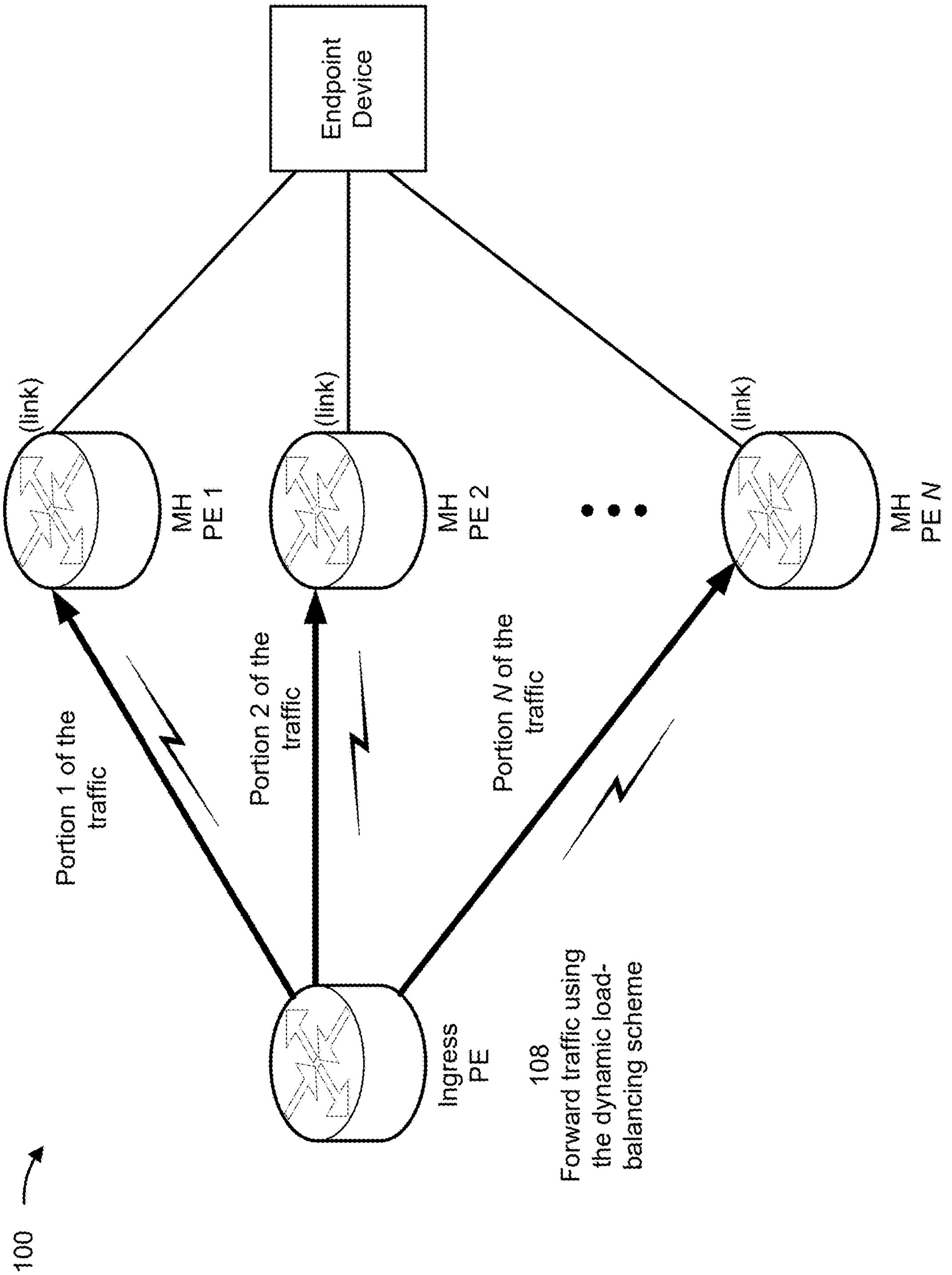

As shown in FIG. 1D, and by reference number 106, the ingress PE may forward traffic using the load-balancing scheme. That is, the ingress PE may forward traffic (e.g., that is destined for the endpoint device) to the plurality of MH PEs using the load-balancing scheme. For example, the ingress PE may determine, based on the load-balancing scheme, a first dynamic load-balancing weight for a first MH PE, of the plurality of MH PEs, and a second dynamic load-balancing weight for a second MH PE of the plurality of MH PEs. The ingress PE then may forward, using the first dynamic load-balancing weight and the second dynamic load-balancing weight, respective portions of the traffic to the first MH PE and the second MH PE. In this way, the ingress PE may forward a first portion of the traffic to the first MH PE, in accordance with the first dynamic load-balancing weight, and a second portion of the traffic to a second MH PE, in accordance with the second dynamic load-balancing weight.

In some implementations, the ingress PE and the plurality of MH PEs may repeatedly perform one or more operations described herein in relation to FIGS. 1A-1D (e.g., on a scheduled basis, on a periodic basis, on an ad-hoc basis, or on a triggered basis).

For example, as part of a first iteration associated with a first time range, the ingress PE may receive respective first advertisement messages from the plurality of MH PEs (e.g., as described herein in relation to FIG. 1A and reference number 102), may obtain first dynamic load information associated with the respective links of the plurality of MH PEs (e.g., as described herein in relation to FIG. 1B and reference number 104), may determine a first dynamic load-balancing scheme associated with the plurality of MH PEs (e.g., as described herein in relation to FIG. 1C and reference number 106), and forward first traffic using the first dynamic load-balancing scheme (e.g., as described herein in relation to FIG. 1D and reference number 108).

As part of a second iteration associated with a second time range (e.g., that does not overlap with the first time range), the ingress PE may receive respective second advertisement messages from the plurality of MH PEs (e.g., as described herein in relation to FIG. 1A and reference number 102), may obtain second dynamic load information associated with the respective links of the plurality of MH PEs (e.g., as described herein in relation to FIG. 1B and reference number 104), may determine a second dynamic load-balancing scheme associated with the plurality of MH PEs (e.g., as described herein in relation to FIG. 1C and reference number 106), and may forward second traffic using the second dynamic load-balancing scheme (e.g., as described herein in relation to FIG. 1D and reference number 108); and so on, for subsequent iterations.

Notably, because the first time range and the second time range are different (e.g., are non-overlapping), dynamic load information associated with each iteration may be different, and therefore the ingress PE may determine and use a different dynamic load-balancing scheme for each iteration. That is, a dynamic load-balancing weight for an MH PE that is indicated by the first dynamic load-balancing scheme (of the first iteration) may be different than (e.g., not equal to) a dynamic load-balancing weight for the MH PE that is indicated by the second dynamic load-balancing scheme (of the second iteration). In this way, the second dynamic load-balancing scheme may be different than the first dynamic load-balancing scheme.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
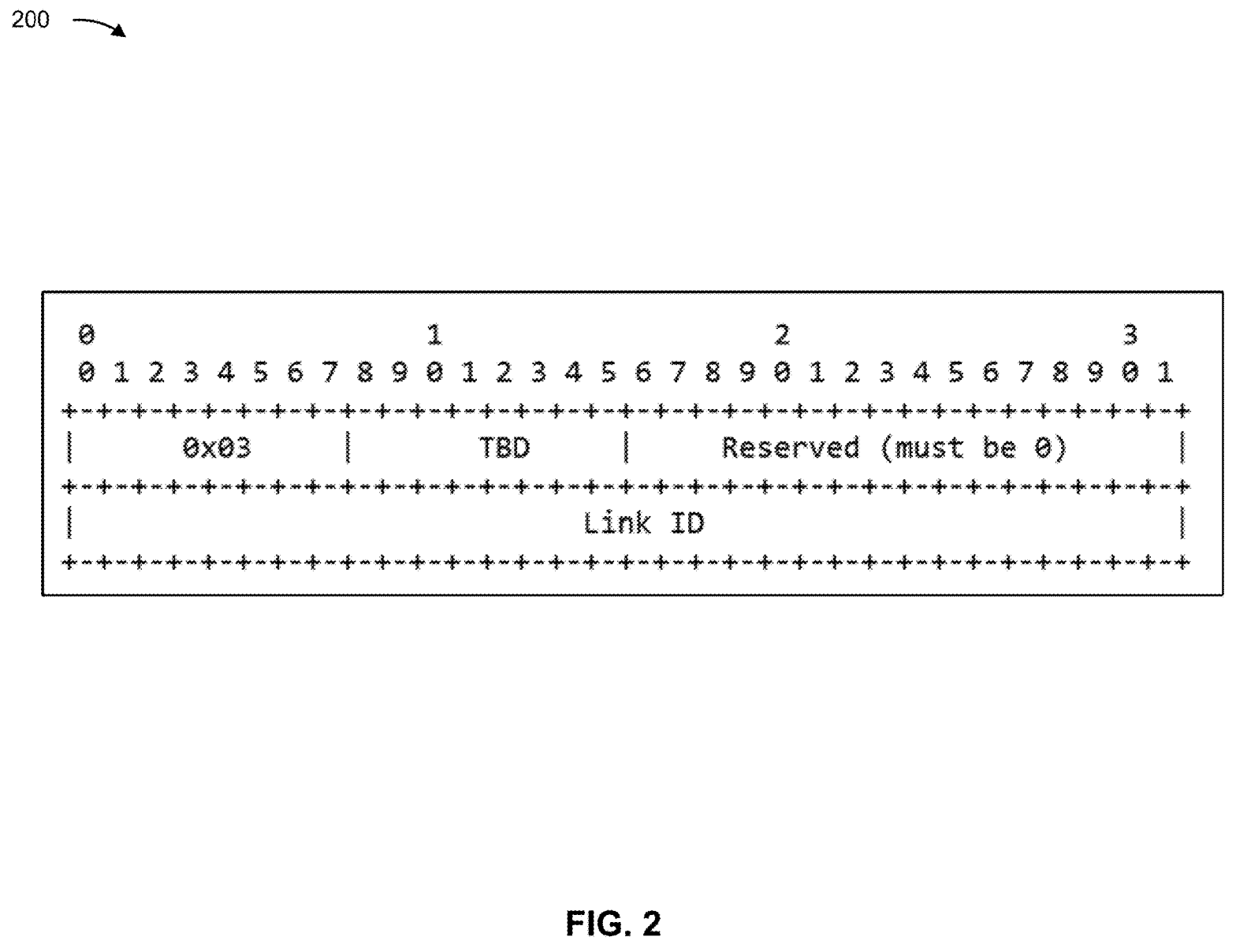

FIG. 2 is a diagram of an example implementation 200 associated with an EC of an EVPN advertisement message (e.g., an EVPN auto-discovery per ES route). The EC may be a transitive opaque EC with a subtype (shown as subtype "TBD," meaning "to be determined," but may be any other particular subtype). As further shown in FIG. 2, the EC may include a link identifier (shown as "Link ID"), which may be included in a field of the EC with a particular size (shown as 32 bits).

The link identifier may be a local link identifier that identifies a link of an MH PE (e.g., the MH PE that sends the EVPN advertisement message). The link may connect, via a connection, the MH PE to an endpoint device, as described herein in relation to FIGS. 1A-1D. The EVPN advertisement message may also comprise information identifying the ESI of the connection between the link and the endpoint device, and, therefore, by including the EC, the EVPN advertisement message may indicate an association between the ESI and the link identifier.

As indicated above, FIG. 2 is provided as an example. Other examples may differ from what is described with regard to FIG. 2.

Figure 3:
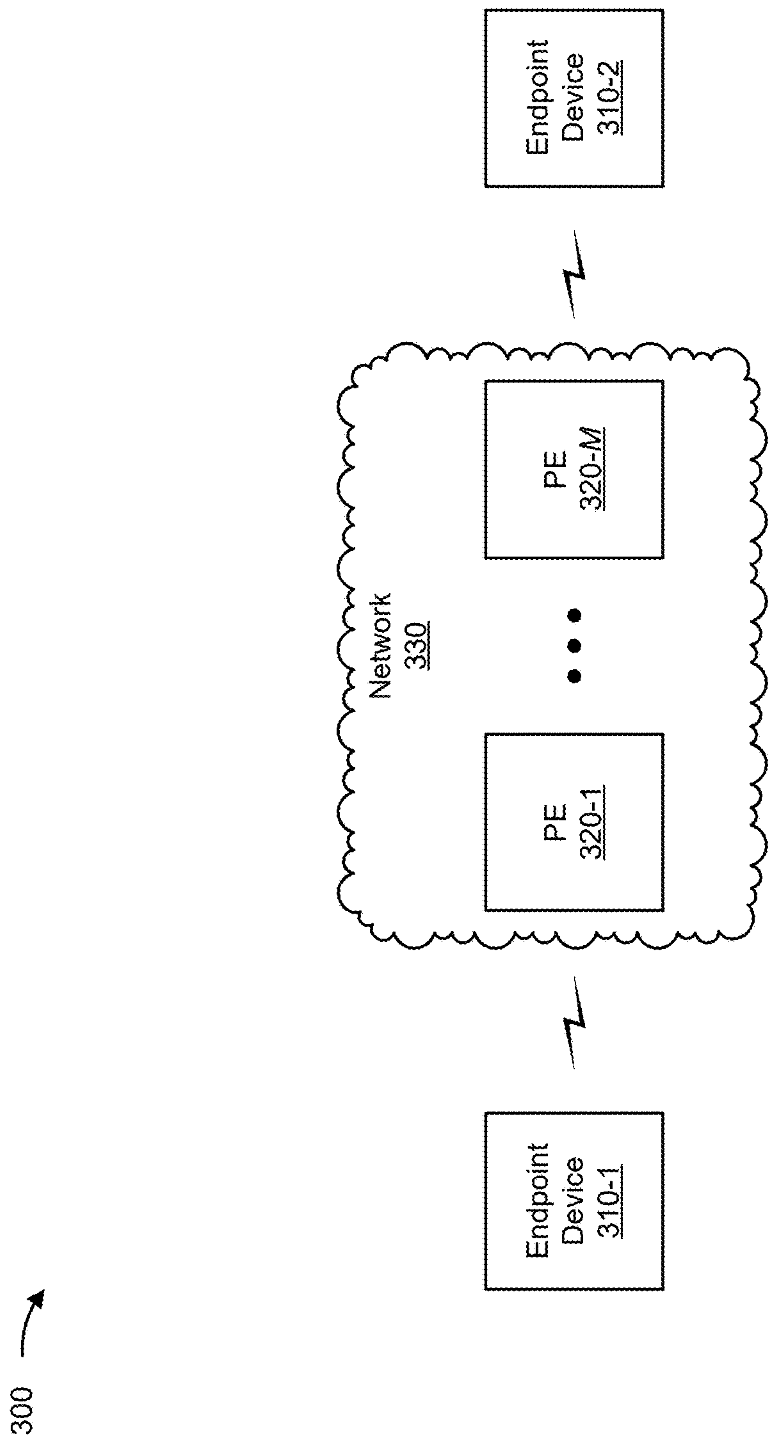
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more endpoint devices 310 (shown as endpoint device 310-1 and endpoint device 310-2), a plurality of PEs 320 (shown as PE 320-1 through PE 320-M), and a network 330. Devices of environment 300 may interconnect via wired connections, wireless connections, or a combination of wired and wireless connections.

Endpoint device 310 includes one or more devices capable of receiving and/or providing traffic. For example, endpoint device 310 may include a traffic transfer device, such as a router, a gateway, a switch, a firewall, a hub, a bridge, a reverse proxy, a server (e.g., a proxy server, a server executing a virtual machine, etc.), a security device, an intrusion detection device, a load balancer, or a similar type of device. In some implementations, endpoint device 310 may include an endpoint device that is a source or a destination for traffic. For example, endpoint device 310 may include a computer or a similar type of device. Endpoint device 310 may receive traffic from and/or may provide traffic (e.g., payload packets) to other endpoint devices 310 via network 330 (e.g., by routing payload packets using PE(s) 320 as an intermediary). In some implementations, endpoint device 310 may include an edge device that is located at an edge of one or more networks. For example, endpoint device 310 may receive traffic from and/or may provide traffic (e.g., payload packets) to devices external to network 330.

PE 320 includes one or more devices capable of receiving, processing, storing, routing, and/or providing traffic in a manner described herein. For example, PE 320 may include a router, such as a label switching router (LSR), a label edge router (LER), an ingress router, an egress router, a provider router (e.g., a provider edge router, a provider core router, etc.), a virtual router, or another type of router. Additionally, or alternatively, PE 320 may include a gateway, a switch, a firewall, a hub, a bridge, a reverse proxy, a server (e.g., a proxy server, a cloud server, a data center server, etc.), a load balancer, and/or a similar device. PE 320 may be an ingress PE or may be an MH PE, such as to provide a multi-homing functionality for an endpoint device 310. In some implementations, PE 320 may be a physical device implemented within a housing, such as a chassis. In some implementations, PE 320 may be a virtual device implemented by one or more computer devices of a cloud computing environment or a data center.

Network 330 includes one or more wired and/or wireless networks. For example, network 330 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
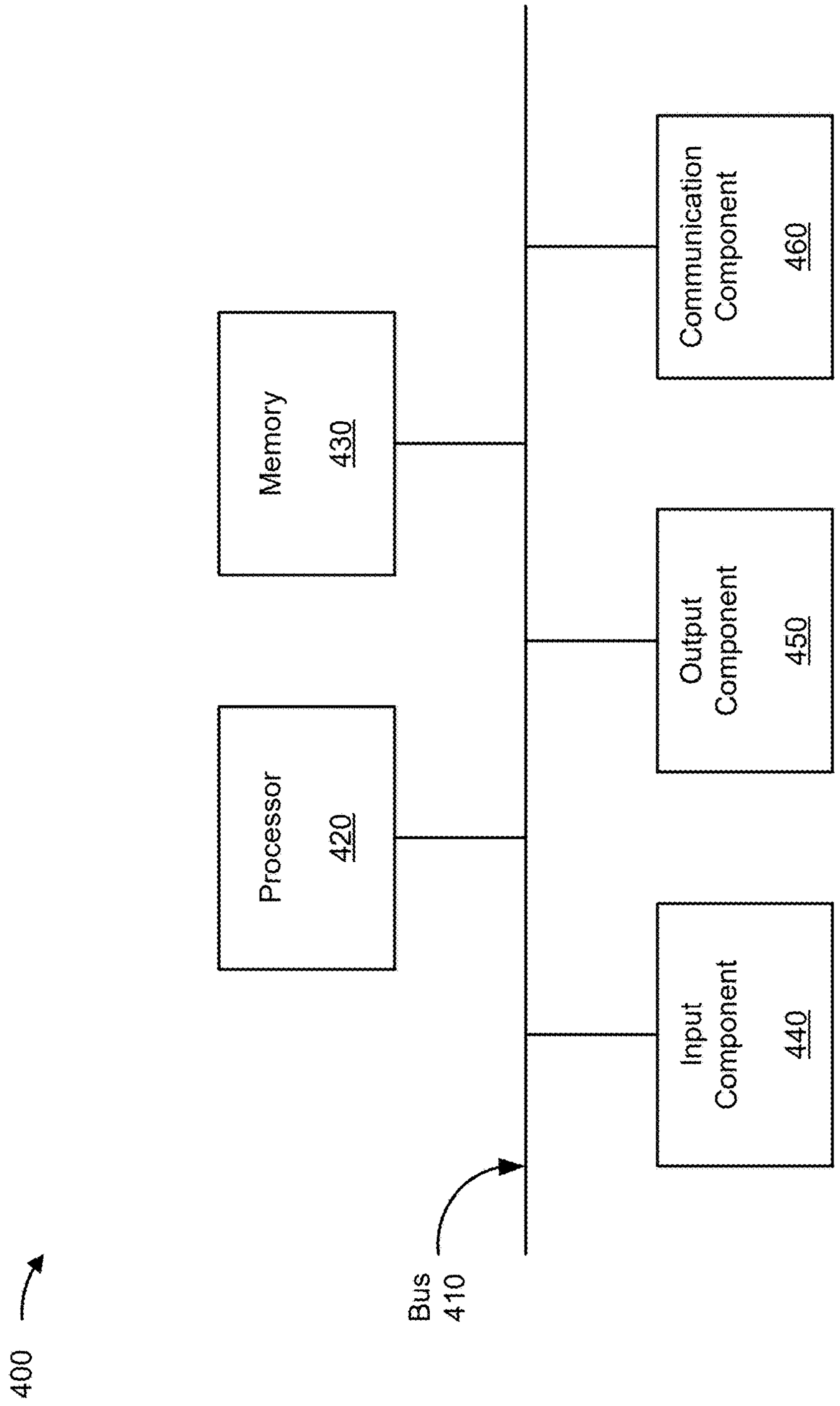
FIG. 4 is a diagram of example components of a device associated with dynamic load-balancing.

FIG. 4 is a diagram of example components of a device 400 associated with dynamic load-balancing. The device 400 may correspond to endpoint device 310 and/or PE 320. In some implementations, endpoint device 310 and/or PE 320 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
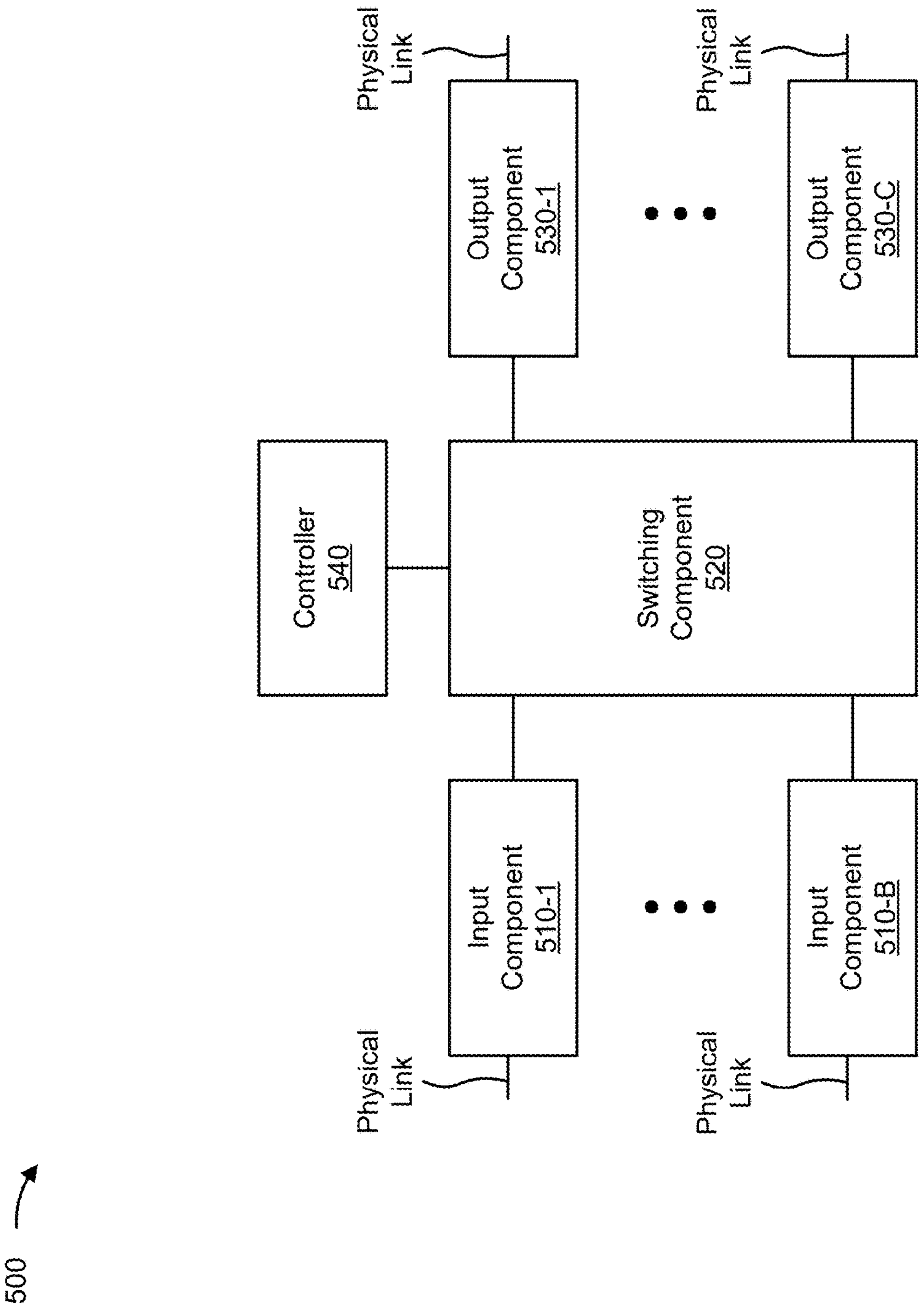
FIG. 5 is a diagram of example components of a device associated with dynamic load-balancing.

FIG. 5 is a diagram of example components of a device 500 associated with dynamic load-balancing. Device 500 may correspond to endpoint device 310 and/or PE 320. In some implementations, endpoint device 310 and/or PE 320 may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a central processing unit (CPU), a graphics processing unit (GPU), an accelerated processing unit (APU), a microprocessor, a microcontroller, a digital signal processor (DSP), an field-programmable gate array (FPGA), an application-specific integrated circuit (ASIC), and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
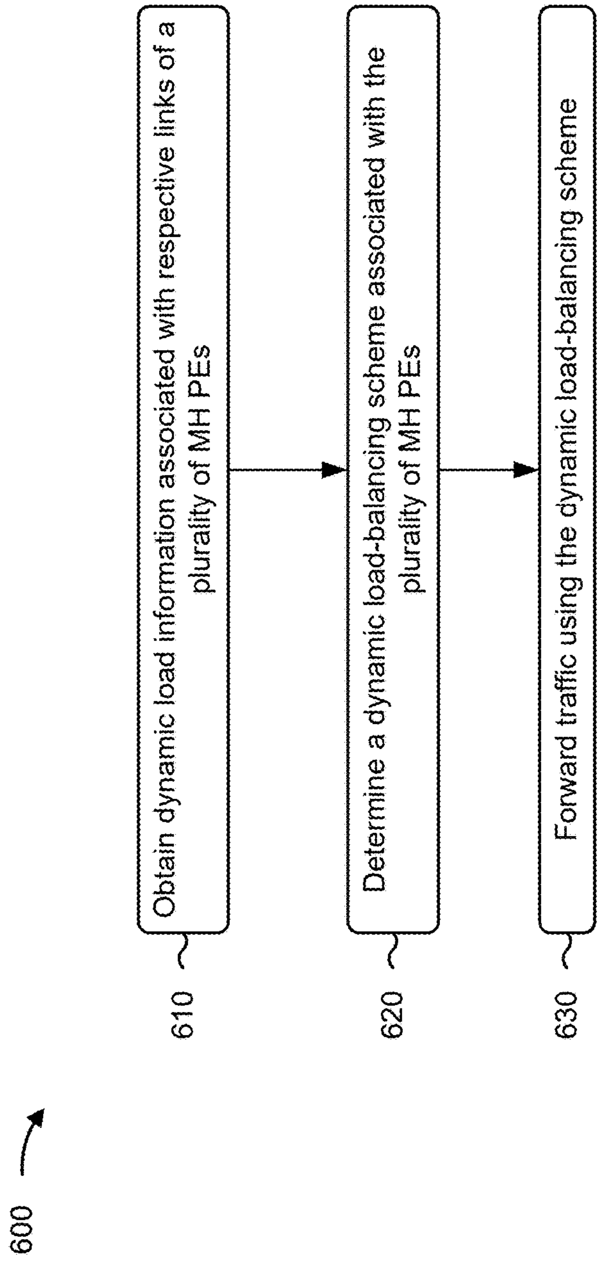
FIG. 6 is a flowchart of an example process associated with dynamic load-balancing.

FIG. 6 is a flowchart of an example process 600 associated with dynamic load-balancing. In some implementations, one or more process blocks of FIG. 6 are performed by an ingress PE (e.g., a PE 320 configured as an ingress PE). In some implementations, one or more process blocks of FIG. 6 are performed by another device or a group of devices separate from or including the ingress PE, such as an MH PE (e.g., a PE 320 configured as an MH PE). Additionally, or alternatively, one or more process blocks of FIG. 6 may be performed by one or more components of device 400, such as processor 420, memory 430, input component 440, output component 450, and/or communication component 460; device 500, such as input component 510, switching component 520, output component 530, and/or controller 540; and/or another device.

As shown in FIG. 6, process 600 may include obtaining dynamic load information associated with respective links of a plurality of PEs (block 610). For example, the ingress PE may obtain dynamic load information associated with respective links of a plurality of MH PES, as described above.

As further shown in FIG. 6, process 600 may include determining a dynamic load-balancing scheme associated with the plurality of MH PEs (block 620). For example, the ingress PE may determine (e.g., based on the dynamic load information) a dynamic load-balancing scheme associated with the plurality of MH PEs, as described above.

As further shown in FIG. 6, process 600 may include forwarding traffic using the dynamic load-balancing scheme (block 630). For example, the ingress PE may forward traffic using the dynamic load-balancing scheme, as described above.

Process 600 may include additional implementations, such as any single implementation or any combination of implementations described below and/or in connection with one or more other processes described elsewhere herein.

In a first implementation, process 600 includes receiving, prior to obtaining the dynamic load information, respective advertisement messages from the plurality of MH PEs, wherein each advertisement message includes a link identifier that identifies a link of an MH PE, of the plurality of MH PEs, that connects the MH PE to an endpoint device or to one or more other destinations.

In a second implementation, alone or in combination with the first implementation, the link identifier is an ESI associated with the link of the MH PE.

In a third implementation, alone or in combination with one or more of the first and second implementations, the link identifier is a local identifier, generated by the MH PE, associated with the link of the MH PE.

In a fourth implementation, alone or in combination with one or more of the first through third implementations, each advertisement message is an EVPN advertisement message that comprises an extended community that includes the link identifier.

In a fifth implementation, alone or in combination with one or more of the first through fourth implementations, each advertisement message is an IP advertisement message that includes the link identifier.

In a sixth implementation, alone or in combination with one or more of the first through fifth implementations, forwarding the traffic using the dynamic load-balancing scheme comprises determining, based on the load-balancing scheme, a first dynamic load-balancing weight for a first MH PE of the plurality of MH PEs; determining, based on the load-balancing scheme, a second dynamic load-balancing weight for a second MH PE of the plurality of MH PEs; and forwarding, using the first dynamic load-balancing weight and the second dynamic load-balancing weight, respective portions of the traffic to the first MH PE and to the second MH PE.

In a seventh implementation, alone or in combination with one or more of the first through sixth implementations, process 600 includes obtaining other dynamic load information associated with the respective links of the plurality of MH PEs, determining, based on the other dynamic load information, another dynamic load-balancing scheme associated with the plurality of MH PEs, and forwarding other traffic using the other dynamic load-balancing scheme.

In an eighth implementation, alone or in combination with one or more of the first through seventh implementations, the other dynamic load-balancing scheme is different than the dynamic load-balancing scheme.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
- receiving, by an ingress provider edge network device (PE), respective advertisement messages from a plurality of multi-homing (MH) PEs,
  - wherein a respective advertisement message, of the respective advertisement messages, includes a link identifier that identifies a link that connects a particular MH PE, of the plurality of MH PEs, to an endpoint device,
    - wherein the endpoint device is multi-homed by the particular MH PE;
- obtaining, by the ingress PE, dynamic load information associated with respective links of the plurality of MH PES;
- determining, by the ingress PE, based on the dynamic load information, a dynamic load-balancing scheme associated with the plurality of MH PEs; and
- forwarding, by the ingress PE, traffic using the dynamic load-balancing scheme.

2. The method of claim 1, wherein the link identifier is an Ethernet segment identifier associated with the link of the MH PE.

3. The method of claim 1, wherein the link identifier is a local identifier, generated by the MH PE, associated with the link of the MH PE.

4. The method of claim 1, wherein each advertisement message is an Ethernet Virtual Private Networks (EVPN) auto-discovery per Ethernet segment (ES) route that includes an extended community that includes the link identifier.

5. The method of claim 1, wherein each advertisement message is an IP route advertisement message that includes the link identifier.

6. The method of claim 1, wherein forwarding the traffic using the dynamic load-balancing scheme comprises:
- determining, based on the load-balancing scheme, a first dynamic load-balancing weight for a first MH PE of the plurality of MH PEs;
- determining, based on the load-balancing scheme, a second dynamic load-balancing weight for a second MH PE of the plurality of MH PEs; and
- forwarding, using the first dynamic load-balancing weight and the second dynamic load-balancing weight, respective portions of the traffic to the first MH PE and to the second MH PE.

7. The method of claim 1, further comprising:
- obtaining other dynamic load information associated with the respective links of the plurality of MH PEs;
- determining, based on the other dynamic load information, another dynamic load-balancing scheme associated with the plurality of MH PEs; and
- forwarding other traffic using the other dynamic load-balancing scheme.

8. The method of claim 7, wherein the other dynamic load-balancing scheme is different than the dynamic load-balancing scheme.

9. The method of claim 1, wherein the respective advertisement message is a user datagram protocol (UDP).

10. A non-transitory computer-readable medium storing a set of instructions, the set of instructions comprising:
- one or more instructions that, when executed by one or more processors of an ingress provider edge network device (PE), cause the ingress PE to:
  - receive respective advertisement messages from a plurality of multi-homing (MH) PES,
    - wherein a respective advertisement message, of the respective advertisement messages, includes a link identifier that identifies a link that connects a particular MH PE, of the plurality of MH PEs, to an endpoint device,
      - wherein the endpoint device is multi-homed by the particular MH PE;
  - determine, based on dynamic load information associated with respective links of the plurality of MH PEs, a dynamic load-balancing scheme associated with the plurality of MH PEs; and
  - forward traffic using the dynamic load-balancing scheme.

11. The non-transitory computer-readable medium of claim 10, wherein the link identifier is one of:
- an Ethernet segment identifier associated with the link of the particular MH PE, or
- a local identifier associated with the link of the particular MH PE.

12. The non-transitory computer-readable medium of claim 10, wherein the one or more instructions further cause the ingress PE to:
- receive, from a particular MH PE, of the plurality of MH PEs, an advertisement message that includes a link identifier that identifies a link of the particular MH PE.

13. The non-transitory computer-readable medium of claim 12, wherein the advertisement message is an EVPN advertisement message.

14. The non-transitory computer-readable medium of claim 10, wherein the one or more instructions, that cause the ingress PE to forward the traffic using the dynamic load-balancing scheme, cause the ingress PE to:
- forward a first portion of the traffic to a first MH PE, of the plurality of MH PEs, in accordance with a first dynamic load-balancing weight associated with the load-balancing scheme; and forward a second portion of the traffic to a second MH PE, of the plurality of MH PEs, in accordance with a second dynamic load-balancing weight associated with the load-balancing scheme.

15. The non-transitory computer-readable medium of claim 10, wherein the dynamic load information associated with a particular MH PE comprises a time-length-value (TLV) that includes particular dynamic load information associated with the particular MH PE.

16. An ingress provider edge network device (PE), comprising:

one or more memories; and one or more processors to:

receive advertisement messages from a plurality of multi-homing (MH) PES, wherein an advertisement message, of the advertisement messages, includes a link identifier that identifies a link that connects a particular MH PE, of the plurality of MH PEs, to an endpoint device, wherein the endpoint device is multi-homed by the particular MH PE;

obtain dynamic load information associated with respective links of the plurality of MH PEs; and determine, based on the dynamic load information, a dynamic load-balancing scheme associated with the plurality of MH PEs that is to be used by the ingress PE to forward traffic.

17. The ingress PE of claim 16, wherein the link identifier is one of:

an Ethernet segment identifier, or a local identifier.

18. The ingress PE of claim 16, wherein the advertisement message is an Ethernet Virtual Private Networks (EVPN) advertisement message.

19. The ingress PE of claim 16, wherein the advertisement message is an IP route advertisement message.

20. The ingress PE of claim 16, wherein the one or more processors are further to:

determine another dynamic load-balancing scheme associated with the plurality of MH PEs that is to be used by the ingress PE to forward traffic after a time interval.

* * * * *